Dec. 6, 1949     R. BURGETT     2,490,668
VEHICLE JACK
Filed Nov. 19, 1946

INVENTOR
ROBERT BURGETT,

By McMorrow, Berman & Davidson
Attorneys

Patented Dec. 6, 1949

2,490,668

UNITED STATES PATENT OFFICE 2,490,668

VEHICLE JACK

Robert Burgett, Hamilton, Ohio

Application November 19, 1946, Serial No. 710,849

2 Claims. (Cl. 254—86)

This invention relates to an automotive vehicle jack of which the following is a specification.

The primary object of this invention resides in the provision of a vehicle jack adapted to raise and support a heavily loaded vehicle when said vehicle is in a stationary position thus preventing the permanent damage to the springs of said vehicle which would ordinarily lose their arc and be permanently damaged if the wheels of the vehicle were allowed to support its heavy load.

Another object of this invention resides in the provision of a jack for an automotive vehicle whose secondary use would be that of supporting the vehicle for the purpose of changing tires or making repairs thereon.

Still another object of this invention is the provision of a jack of the character described which is permanently secured to an automotive vehicle of the truck or trailer type and is quickly and easily operable for the purpose of raising the vehicle and supporting it when it is heavily loaded.

Still a further object of this invention is the provision of a jack of the character described which is of simple, durable and extremely inexpensive design.

Further improvements and advantages of this invention will readily appear to those skilled in the art when the following description is read in the light of the accompanying drawings in which.

Figure 1:
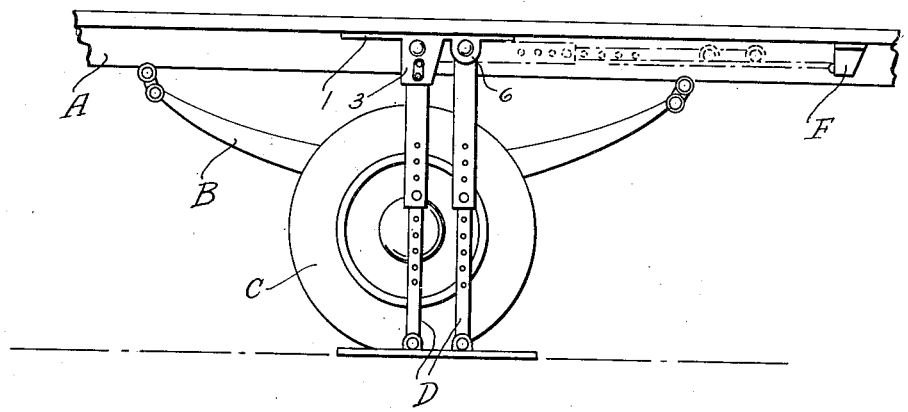
Fig. 1 is a side elevation of the jack secured to a vehicle in a supporting position.

Referring now to the accompanying drawings in which like numerals indicate similar parts throughout A designates the bed or frame of an automotive vehicle of the trailer or truck type which is provided with an arc spring B secured therebeneath and a wheel C carried by said arc spring in engagement with the ground for the purpose of supporting and allowing the motion of the vehicle.

Secured to the underside of the bed A in a position directly above the center of the wheel C is a bracket 1 which comprises a flat plate 2 with a pair of depending sides 3 therefrom substantially in the middle thereof and an enclosing plate 4 at the rearward end of said sides. Disposed centrally of said plate between sides 3 is a pair of depending ears 5. A second pair of depending ears 6 are secured in longitudinal alignment with and at a spaced distance forward from the ears 5.

The side members 3 and the ears 5 are provided with circular apertures 7 therein which are in alignment transverse these members. The ears 6 are also provided with circular apertures 8 in alignment, said apertures being in a same horizontal plane, with the apertures 7 carried by the first said members.

Three legs D are used as supporting members for the jack, these legs being vertically adjustable by means of two telescoping members 9 and 10 which are selectively positioned one within the other and secured in such a position by means of a pin or stud 11 and a nut 12 which are inserted in one of a plurality of vertically spaced apertures 13 horizontally penetrating said telescoping members. These three legs D are suspended from the supporting bracket 1 with two of said legs pivotally supported each between one of the ears 5 and one of the sides 3 by an axle 14 inserted in the apertures 7 therein, and the third leg being pivotally suspended from between the ears 6 on a rod 15 carried by the apertures 8 therein. This provides for two legs supported in transverse alignment with a third leg supported forward therefrom and in longitudinal alignment in spaced distance therebetween.

A sole or supporting plate E of rectangular shape is pivotally supported by raised ears 16 and pins 17 to the lower ends of the three legs D in such a manner as to form a horizontal base for said legs when they are in a vertically disposed position.

Figure 2:
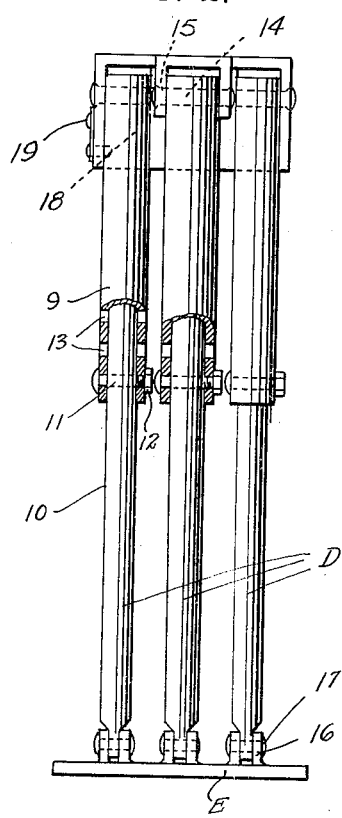
Fig. 2 is a front view of the jack.
Figure 3:
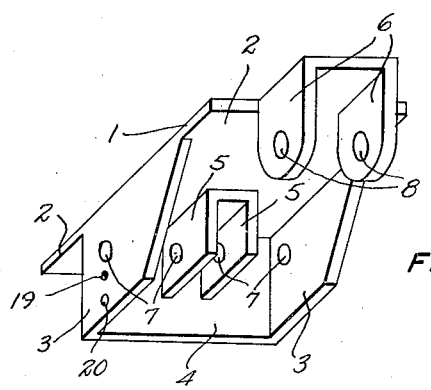
Fig. 3 is a perspective view of the supporting plate or bracket.

Thus it may be seen that these legs may be positioned vertically as illustrated in Figs. 1 and 2 with the plate E horizontally disposed therebeneath for the purpose of engaging the ground and supporting the frame or bed of the vehicle in such a manner as to relieve the strain on the spring B caused by the weight of the loaded vehicle. The spaced positioning of the three legs D relative to one another results, during use, in the one leg, that is, the foremost leg, resisting pivoting or forwardly-toppling action on the part of the rearward pair of legs, and vice versa. The forward and rearward legs mutually brace one another against wavering or toppling movement. It may also be seen, by the dotted lines in Fig. 1, that these legs D may be swung forward and upwardly with the forward leg D falling between the rearward pair of legs and the plate E retaining its horizontal position so that the assembly may be horizontally disposed adjacent the underside of the frame or bed A in a manner to form an out-of-the-way yet conveniently positioned jack for the vehicle when said jack is not in use.

The legs and plate are retained in this horizontal position by a resilient engaging means (not shown) carried by bracket F which is also secured to the underside of the bed A at a spaced distance forward from and in alignment with the supporting bracket I.

A pin 18 which is pivoted to the outer side of one of the depending sides 3, of the supporting bracket I, as at 19 is adapted to be inserted in an aperture 20 in the side 3 to engage a detent 21 in the adjacent leg D thereto for the purpose of locking the legs D in their vertical supporting position thus preventing their pivotal movement rearward when bringing them in use for the purpose of supporting the vehicle. This pin 18 is quickly and easily operable to be inserted or removed from the aperture 20 allowing the return of said legs D to their horizontal stored position when it is so desired.

Thus it may be seen that an always available and quickly and easily operable jack has been provided for use with vehicles of the truck or trailer type for supporting the weight of said vehicle when it is loaded to prevent damage to the spring thereof, and also a jack which can be used for the purpose of changing tires and supporting the vehicle for general repairs.

Having thus described and explained the construction and operation of this invention, what I desire to claim is:

1. The combination with a vehicle, of a jack comprising a pair of legs mounted by one end on an under part of the vehicle in spaced relation transversely thereof and for pivotal forward and backward movement relative to the vehicle, a third leg similarly mounted forwardly of said pair of legs, and a plate pivotally connected to the outer ends of the legs and retaining the same in spaced parallel relation, said plate, when the legs are swung down, being adapted to rest at an angle against the ground and to move to a flat position thereon when the vehicle is actuated in the direction of upward inclination of the plate whereby the legs are disposed vertically and the vehicle raised.

2. The combination with a vehicle, of a jack comprising a pair of legs mounted by one end on an under part of the vehicle in spaced relation transversely thereof and for pivotal forward and backward movement relative to the vehicle, a third leg similarly mounted forwardly of said pair of legs, a plate pivotally connected to the outer ends of the legs and retaining the same in spaced parallel relation, said plate, when the legs are swung down, being adapted to rest at an angle against the ground and to move to a flat position thereon when the vehicle is actuated in the direction of upward inclination of the plate whereby the legs are disposed vertically and the vehicle raised, and means for releasably locking the legs in said vertical position.

ROBERT BURGETT.

REFERENCES CITED

The following references are of record in the file of this patent:

UNITED STATES PATENTS

| Number | Name | Date |
| --- | --- | --- |
| 1,414,903 | Thomas | May 2, 1922 |
| 1,890,972 | Davis | Dec. 13, 1932 |
| 1,930,802 | Hamilton | Oct. 17, 1933 |
| 2,012,554 | Travis | Aug. 27, 1935 |
| 2,132,903 | MacMurray | Oct. 11, 1938 |
| 2,343,459 | Hines | Mar. 7, 1944 |